United States Patent [19]
Watanabe et al.

[11] Patent Number: 5,256,862
[45] Date of Patent: Oct. 26, 1993

[54] CASH MANAGING SYSTEM

[75] Inventors: Hiroshi Watanabe, Chigasaki; Hajime Watanabe, Tokyo, both of Japan

[73] Assignee: Kabushiki Kaisha Toshiba, Kawasaki, Japan

[21] Appl. No.: 766,407

[22] Filed: Sep. 27, 1991

[30] Foreign Application Priority Data

Sep. 28, 1990 [JP] Japan ................................. 2-256968

[51] Int. Cl.⁵ .............................................. G06F 15/30
[52] U.S. Cl. ..................................................... 235/379
[58] Field of Search ....................................... 235/379

[56] References Cited

U.S. PATENT DOCUMENTS

| | | | |
|---|---|---|---|
| 4,524,268 | 6/1985 | Fukatsu | 235/379 |
| 4,554,444 | 11/1985 | Hirose | 235/379 |
| 4,866,254 | 9/1989 | Okayama et al. | 235/379 |
| 4,928,230 | 5/1990 | Kawamura et al. | 235/379 |
| 4,953,086 | 8/1990 | Fukatsu | 235/379 |
| 4,992,648 | 2/1991 | Hutchison | 235/379 |
| 5,135,212 | 8/1992 | Utsumi et al. | 235/379 |
| 5,158,274 | 10/1992 | Hamada et al. | 235/379 |

FOREIGN PATENT DOCUMENTS 63-18235 4/1988 Japan.

*Primary Examiner*—Carolyn E. Fields
*Assistant Examiner*—Drew A. Dunn
*Attorney, Agent, or Firm*—Cushman, Darby & Cushman

[57] ABSTRACT

A cash managing system includes a plurality of automatic teller machines for receiving and dispensing bank notes from and to a customer, a bank note arrangement device for arranging bank notes handled by the teller machines, and a loading safe which is designed to be selectively mounted on each of the machines and the arrangement device. The loading safe has a storing section for storing bank note storage data of the teller machine on which the safe is mounted, and an output section for outputting the stored storage data when the safe is mounted on the arrangement device. When the loading safe is mounted on the arrangement device, the device receives the storage data of the teller machines from the output section of the loading safe totals the received data.

7 Claims, 16 Drawing Sheets

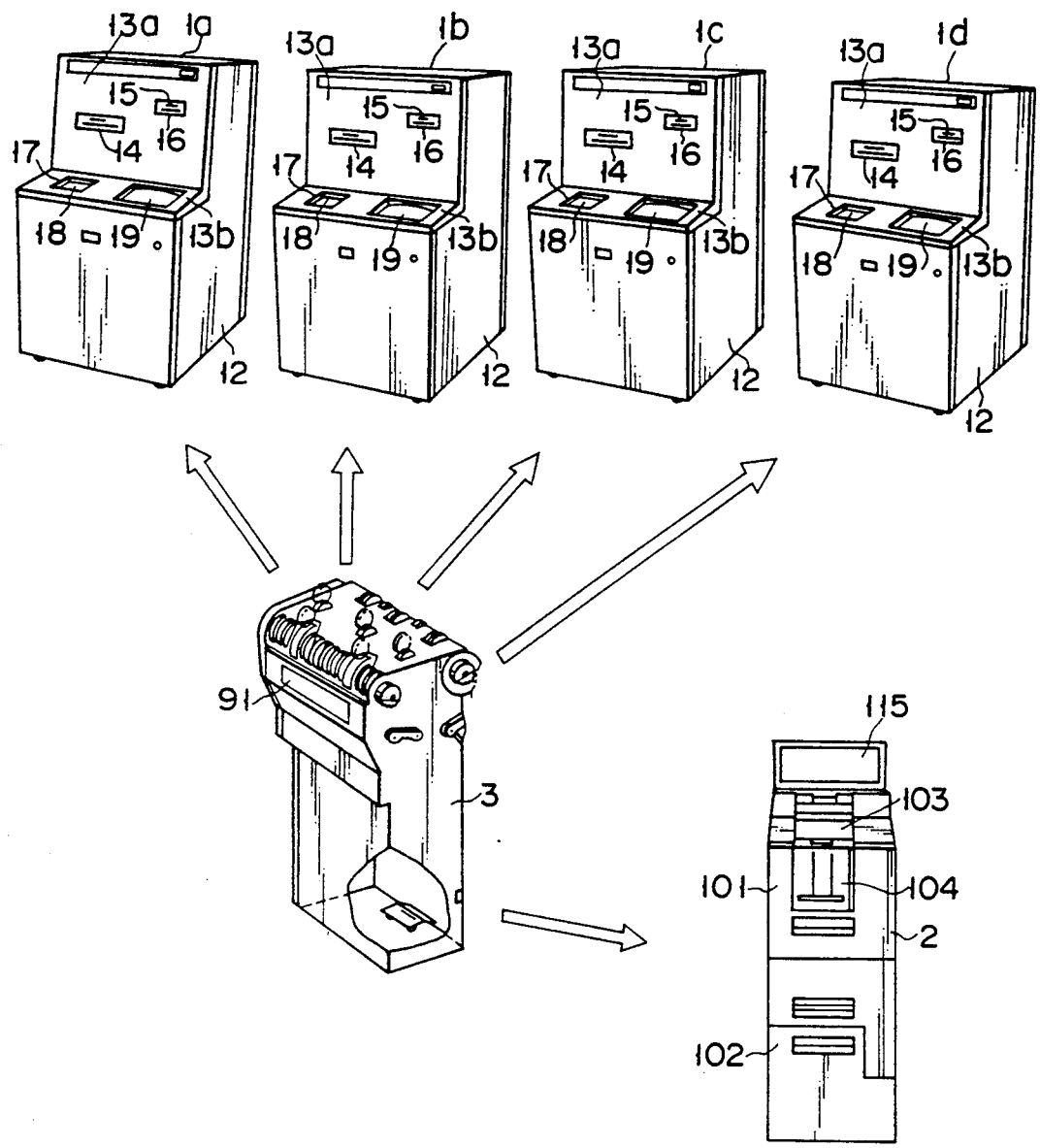
F I G. 1

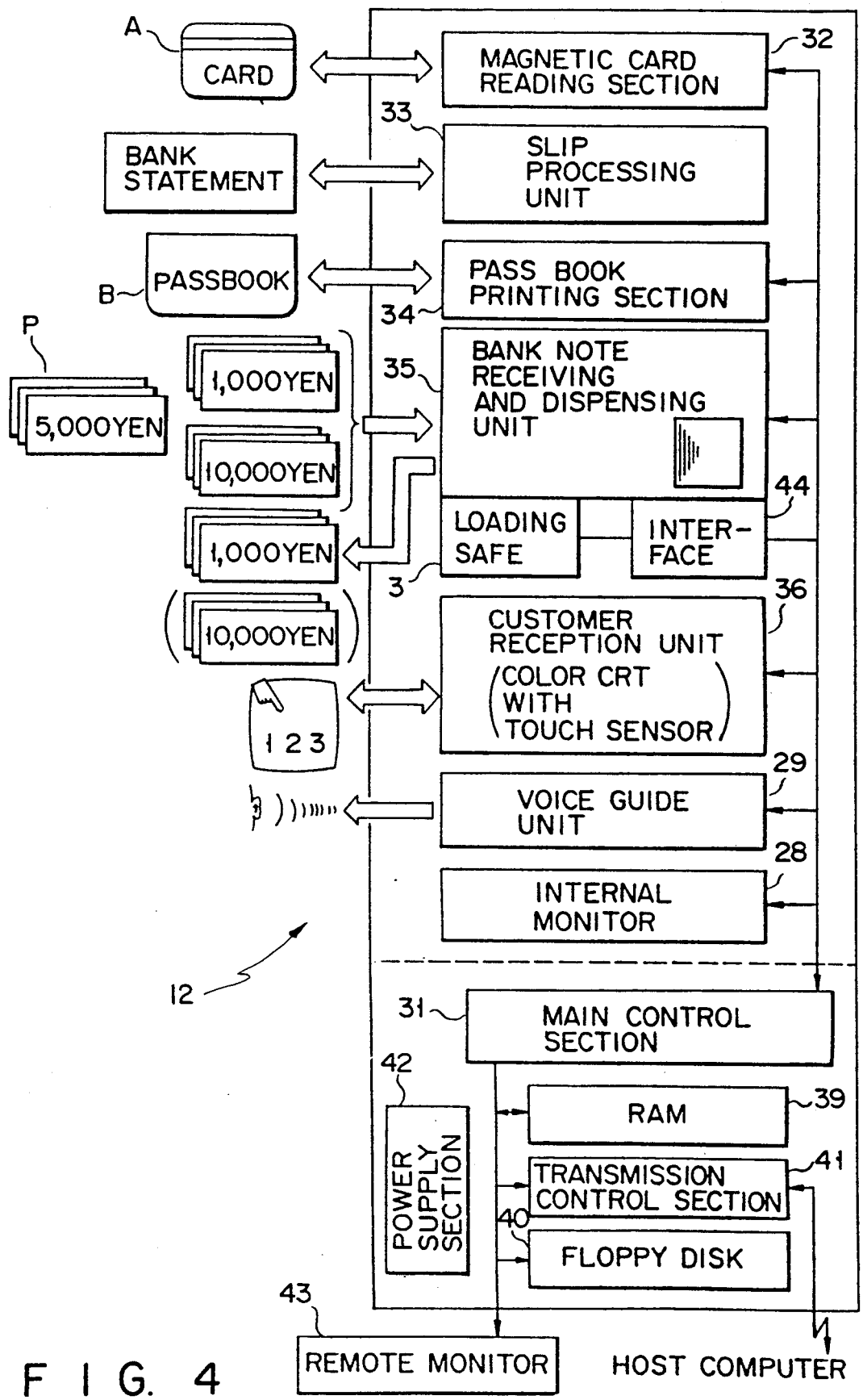
F I G. 4

| | |
|---|---|
| ¥1,000 BANK NOTE SAFE | ○ ○ ○ ○ YEN |
| ¥10,000 BANK NOTE SAFE | ○ ○ ○ ○ YEN |
| BANK NOTE RECEPTION SAFE | ○ ○ ○ ○ YEN |
| LOADER | ○ ○ ○ ○ YEN |

39

F I G. 5

| MACHINE NUMBER | CASH BALANCES OF RESPECTIVE SAFES | NUMBERS OF BANK NOTES IN UNITS OF DENOMINATIONS |
|---|---|---|
| | | |

NUMBER OF BANK NOTES IN UNITS OF DENOMINATIONS IN LOADER

REPLENISH DESIGNATION DATA

FIG. 15

93 labels the upper table.

---

| |
|---|
| STORING STATE OF AUTOMATIC TELLER MACHINE A |
| STORING STATE OF AUTOMATIC TELLER MACHINE B |
| STORING STATE OF AUTOMATIC TELLER MACHINE C |
| STORING STATE OF AUTOMATIC TELLER MACHINE D |
| STORING STATE OF BANK NOTE ADJUSTING DEVICE |

111 labels the table.

FIG. 17

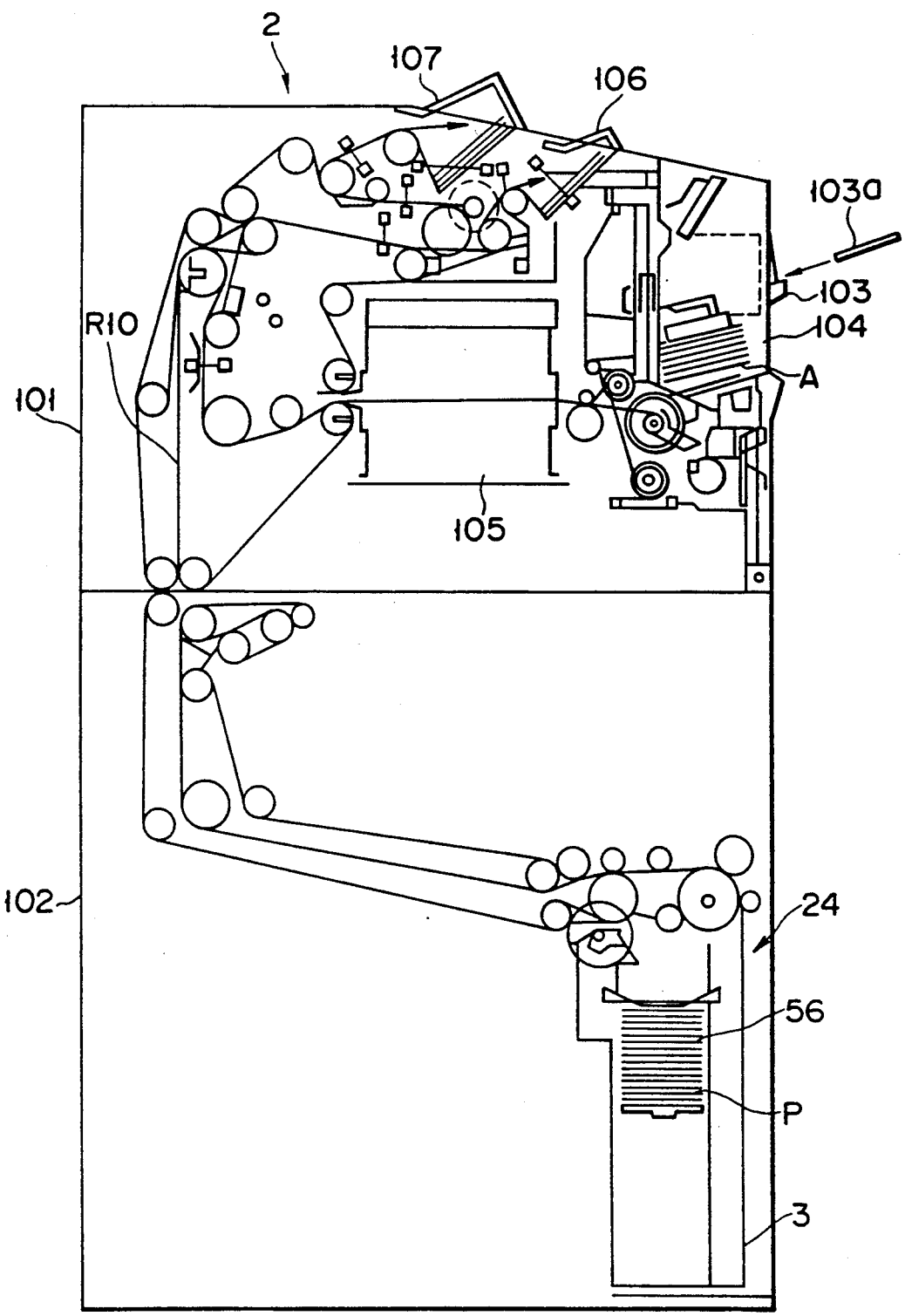
F I G. 16

CASH MANAGING SYSTEM

BACKGROUND OF THE INVENTION

1. Field of the Invention

The present invention relates to a cash managing system which comprises a plurality of automatic teller machines, installed in, e.g., a bank, for automatically receiving and dispensing cash, i.e., bank notes, and which collectively manages the bank notes and information in the teller machines.

2. Description of the Related Art

Cash loading and unloading in and from various types of teller machines used in banks and the like are currently performed manually, and human factors are present in this management. Accordingly, when an actual amount of bank notes does not coincide with data, time-consuming, cumbersome procedures must be taken to find the cause.

For this reason, a system disclosed in Published Examined Japanese Patent Application No. 63-18235 comprises a loader that can be commonly used for a plurality of teller machines, and bank note loading/unloading operations with respect to the teller machines are performed not manually but by using the loader.

However, since the loader only manages its own bank note balance, management of the bank note balance of each of the plurality of teller machines and collective management of those individual bank note balances must be finally manually performed. Alternatively, an exclusive information processing device need be provided for this purpose.

SUMMARY OF THE INVENTION

The present invention has been made in consideration of the above situation, and has as its object to provide a cash managing system capable of automatically performing management of the bank note balance of each of a plurality of automatic teller machines and collective management of those individual bank note balances.

In order to achieve the above object, a cash managing system according to the present invention comprises a plurality of automatic teller machines each of which includes storage means for storing bank notes, and means for dispensing the bank notes in the storage means to a customer; data transfer means designed to be selectively connected to each of the automatic teller machines and including data receiving means for receiving bank note storage data, indicating the amount of the bank notes stored in the respective automatic teller machines, from each of the automatic teller machines, and storing means for storing the bank note storage data of each of the automatic teller machines; and an arrangement device including second data receiving means for receiving the bank note storage data of the automatic teller machines from the data transfer means, and means for calculating the total of the bank notes stored in the automatic teller machines on the basis of the storage data received by the second data receiving means.

According to the present invention having the above-mentioned arrangement, the amount of bank notes stored in the respective automatic teller machines are input to the data transfer means and stored in the storing means. Data concerning the automatic teller machines are input to the bank note arrangement device when the transfer means is connected to the arrangement device and are totalized thereby. Therefore, management of the bank note balances of the plurality of automatic teller machines and collective management of these machines can be automatically performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 17 show a cash managing system according to an embodiment of the present invention, in which:

FIG. 1 is a perspective view schematically showing the overall arrangement of the cash managing system;

FIG. 2 is a block diagram showing the configuration of the cash managing system;

FIG. 3 is a perspective view showing an outer appearance of a automatic teller machine;

FIG. 4 is a block diagram showing an internal configuration of the teller machine;

FIG. 5 is a table showing a memory content of a RAM of the teller machine;

FIG. 6 is a sectional view showing the internal arrangement of a bank note receiving/dispensing unit;

FIGS. 7 and 8 are sectional views, respectively, schematically showing the flow of bank notes in a bank note receiving operation;

FIG. 9 is a sectional view schematically showing the flow of bank notes in a bank note dispensing operation;

FIG. 10 is a sectional view schematically showing the flow of bank notes in an operation for recovering the bank notes forgotten by a customer;

FIG. 11 is a sectional view schematically showing the flow of bank notes in a loading operation;

FIG. 12 is a sectional view schematically showing the flow of reject bank notes;

FIG. 13 is a sectional view schematically showing the flow of bank notes in an inspection operation;

FIG. 14 is a perspective view of a loading safe;

FIG. 15 shows a memory content of the data memory of the loading safe;

FIG. 16 is a sectional view showing an internal arrangement of a bank note arrangement device; and FIG. 17 shows a memory content of the data memory of the arrangement device.

DETAILED DESCRIPTION OF THE PREFERRED EMBODIMENTS

A preferred embodiment of the present invention will be described with reference to the accompanying drawings.

Figure 2:
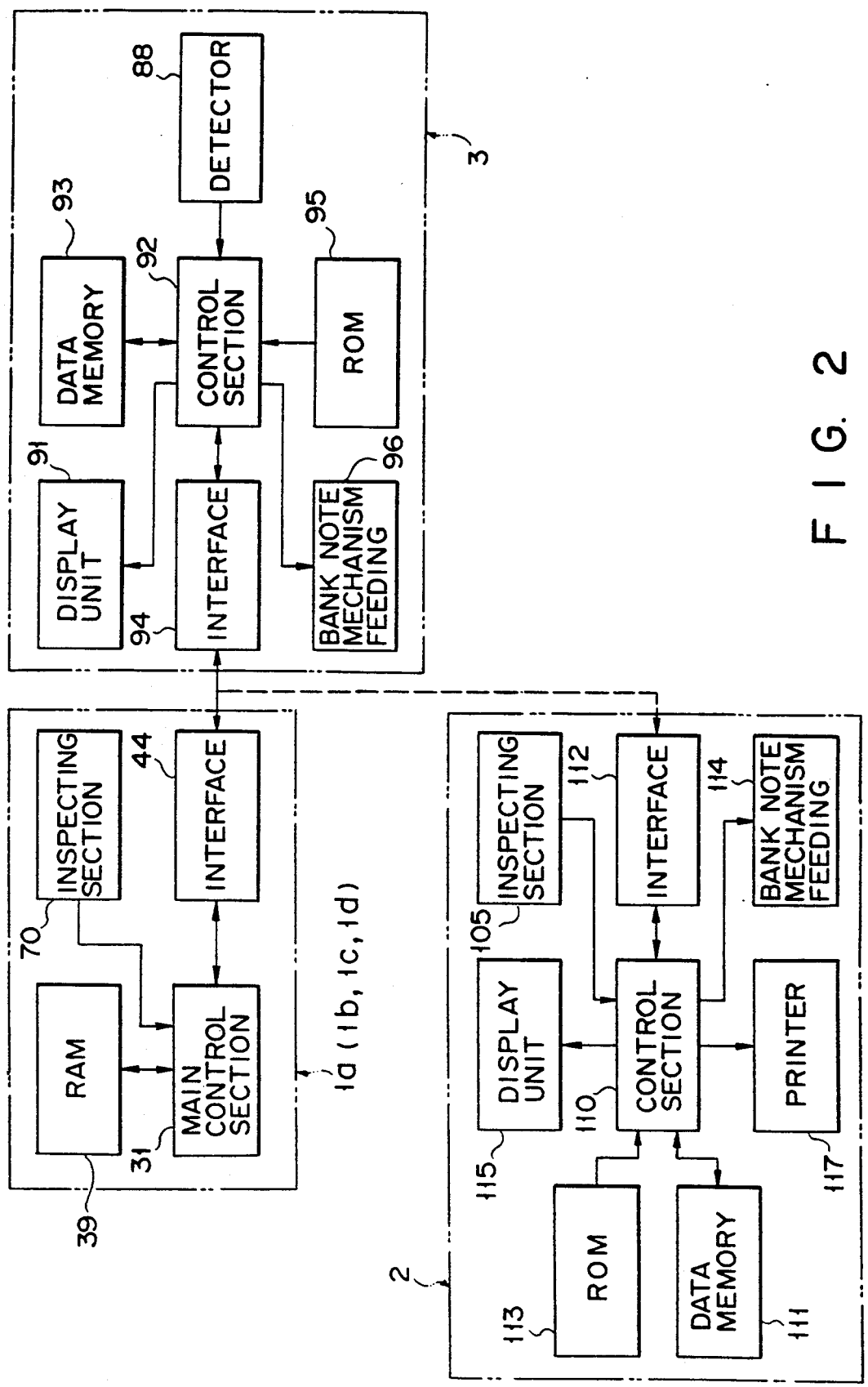

As shown in FIGS. 1 and 2, a cash managing system according to the embodiment of the present invention comprises automatic teller machines 1a, 1b, 1c, and 1d as a plurality (four), a bank note arrangement device 2, and a loading safe 3 as a loader or a bank note cassette, which can be selectively loaded in each of the teller machines and the arrangement device 2.

Figure 3:
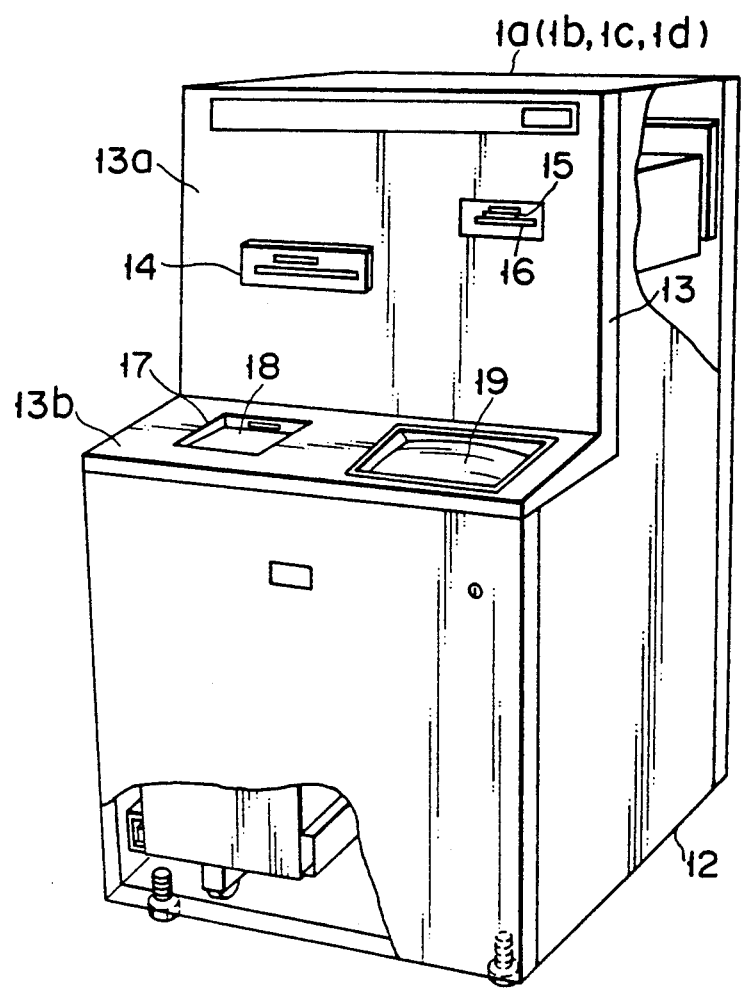

The teller machines 1a to 1d have the same configuration and thus will be represented by the machine 1a with reference to FIGS. 3 to 5.

As shown in FIG. 3, the teller machine 1a has a housing 12, and a substantially L-shaped operation section 13 is formed on the front surface of the housing 12. A passbook insertion slot 14, a card insertion slot 15, and a bank statement issuing slot 16 are formed in a vertical portion 13a of the operation section 13.

A receiving/dispensing opening 17 as a bank note receiving portion which serves as both reception and dispensing openings is formed in a horizontal portion 13b of the operation section 13, and a door 18 for opening and closing the opening 17 is provided at the opening 17. A CRT display unit 19 incorporating touch sensors is provided at the horizontal portion 13b. The display unit 19 displays an operation sequence of the teller machine and other information by using an illustration, characters, and words and sentences, in order to prompt the user. When the user depresses a display portion corresponding to his secret identification number, an amount of bank notes, an account number, approval of the transaction, confirmation, or cancellation displayed on the display unit 19, the teller machine is operated.

As shown in FIGS. 2 and 4, the housing 12 incorporates a main control section 31, a magnetic card reading section 32, a bank statement processing unit 33, and a passbook printing section 34. The main control section 31 controls the entire teller machine. When a card A is inserted through the card insertion slot 15, the reading section 32 reads account information, e.g., a secret identification number, an account number, and the like from a magnetic stripe on the card A. The processing unit 33 issues a bank statement printed with the transaction content through the issuing slot 16. The passbook printing section 34 reads the magnetic stripe on a passbook B inserted through the passbook insertion slot 14 and records the transaction content on journal paper (not shown).

The housing 12 also incorporates a bank note receiving/dispensing unit 35, a customer reception unit 36, a voice guide unit 29, and an operator unit having an internal monitor 28. The bank note receiving/dispensing unit 35 accepts a bank note P inserted in the bank note receiving/dispensing opening 17 and dispenses bank notes P in a designated amount to the openings 17. The customer reception unit 36 includes the CRT display unit 19. The voice guide unit 29 produces a voice through a loudspeaker (not shown) to guide the customer. The operation unit with the internal monitor 28 a person in charge is operated by him. When the loading safe 3 is mounted in the bank note receiving/dispensing unit 35, it is connected to the main control section 31 through an interface 44 and transfers data between the unit 35 and the safe 3.

The housing 12 also incorporates a RAM 39, a floppy disk drive 40, a transmission control section 41, and a power supply section 42. The RAM 39 stores bank note storing states of the respective leading safe 3 in the unit 35 and data identifying the loading safe 3 in accordance with an inspection result supplied from an inspecting section (to be described later) in the unit 35. The floppy disk drive 40 serves as a data file for storing information of financial institutions, e.g., the names of banks and branches, which are required for transfer transactions, in the order of the Japanese syllabary. The transmission control section 41 controls data transmission between the main control section 31 and a host computer (not shown). The RAM 39 stores the stored amounts in the various safes (discussed later), as shown in FIG. 5.

The main control section 31 is connected to a remote monitor 43 for the person in charge, which is provided outside the housing 12. Local processing (examination processing for examining the internal state of the teller machine) such as bank note balance detection, safe exchange, or journal replenishment is designated to the person in charge through the internal monitor 28 and the remote monitor 43.

The main control section 31 and the loading safe 3 set in the receiving/dispensing unit 35 are connected to each other through an interface 44 (not shown). The insertion of the loading safe 3 in the unit 35 is confirmed through data transfer between the main control section 31 and the safe 3. The main control section 31 supplies data of the bank note storing states of the respective safes of the teller machine 1a to the loading safe 3, and the safe loading 3 sends the bank note storing state thereof to the main control section 31.

Figure 6:
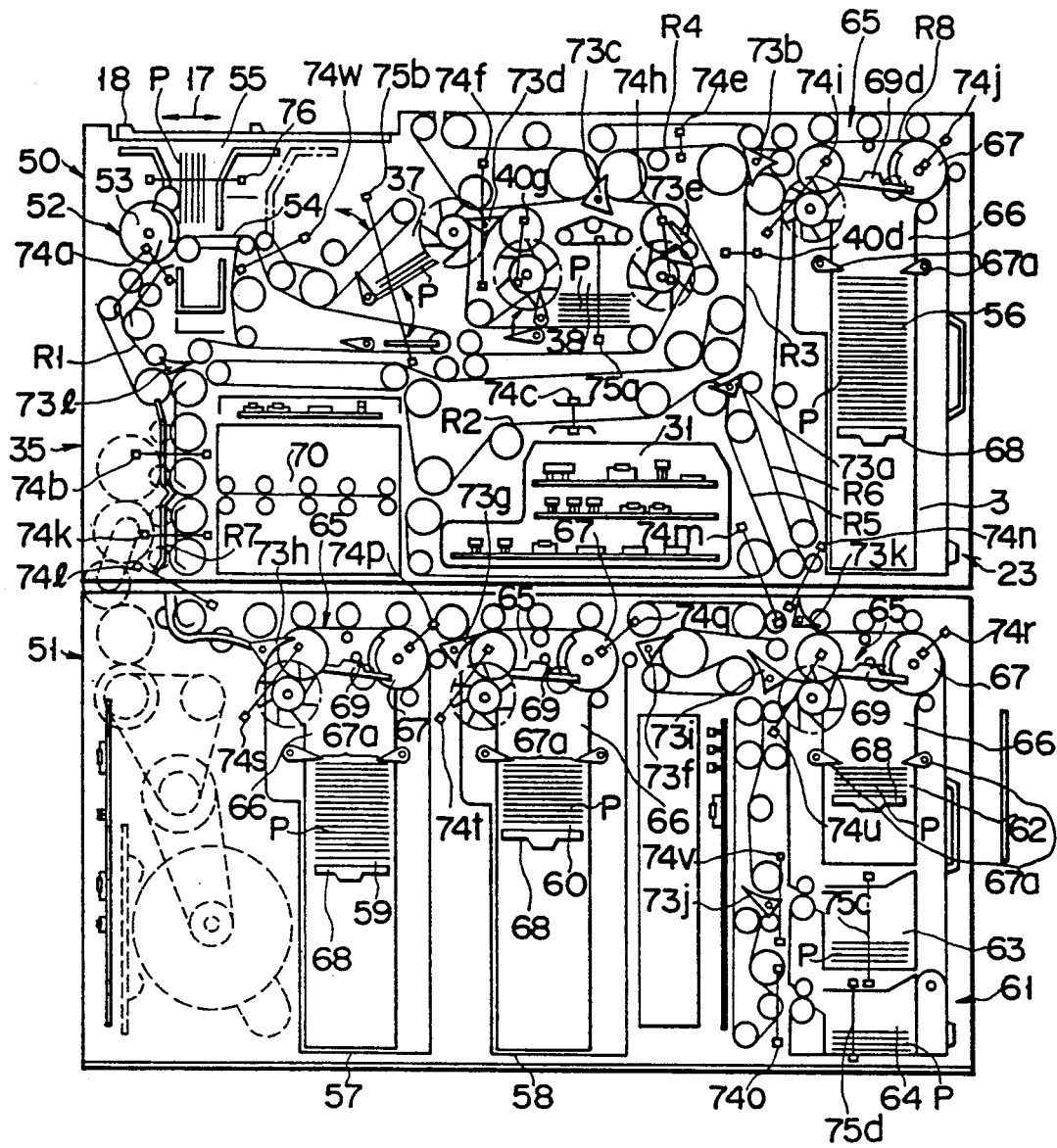

FIG. 6 shows the arrangement of the bank note receiving/dispensing unit 35. The unit 35 mainly has upper and lower units 50 and 51.

A bank note take-in/take-out unit 52 is provided in an upper front (directed to the customer) portion of the upper unit 50 and opposes the opening 17. The unit 52 has a take-in roller 53, a floor 54, and a bank note storage chamber 55. A mounting section 23 is provided in the rear portion of the upper unit 50. The loading safe 3, acting as a fourth safe, is designed to be set in the mounting section 23. The safe 3 has a storage section 56 storing bank notes P.

A first safe 57 as the ¥ 10,000 bank note safe and a second safe 58 as the ¥ 1,000 bank note safe are arranged in the lower unit 51 to constitute bank note storage sections 59 and 60, respectively. A third safe 61 is provide in the lower unit 51 and serves as a bank note reception safe for storing a bank note, e.g., ¥ 5,000 bank notes, reject bank notes, or recovery bank notes inappropriate to be dispensed. The safe 61 has a bank note storage section 62, a stacking section 63, and a recovery box 64. A stacking and taking mechanism 65 is provided at the upper portion of each of the safes 57, 58, 61, and 3, and flaps 67a for defining a stacking space 66 capable of stacking, e.g., 100 bank notes therein, are provided in each safe. Each mechanism 65 has a take-out roller 67, an elevator 68, and a press plate 69.

An inspecting section 70 is provided in the lower portion of the upper unit 50, and a stacking section 38 for temporary stacking bank notes to be dispensed and a stacking section 37 for temporary stacking the received bank notes are provided above the inspecting section 70.

A multiple of feed rollers and conveyor belts are arranged in the units 50 and 51 to form bank note convey paths R1 to R8 for conveying bank notes P to the respective sections inside the unit 35. Gates 73a to 73l connected to rotary solenoids (not shown) as the drive sources are arranged at branching portions of the convey paths. Detectors 74a to 74w for detecting passing of the bank notes are arranged at predetermined portions along the bank note convey paths. Detectors (remaining bank note check sensors) 75a to 75d, and 76 for detecting presence/absence of the bank notes are arranged at the respective stacking sections where the bank notes P are stacked. The detectors 74a to 74w and the detectors 75a to 75d, and 76 have a known construction including a light-emitting element and a light-receiving element.

The operation (flow of the bank note) of the bank note receiving/dispensing unit 35 having the above arrangement will be described.

Figure 7:
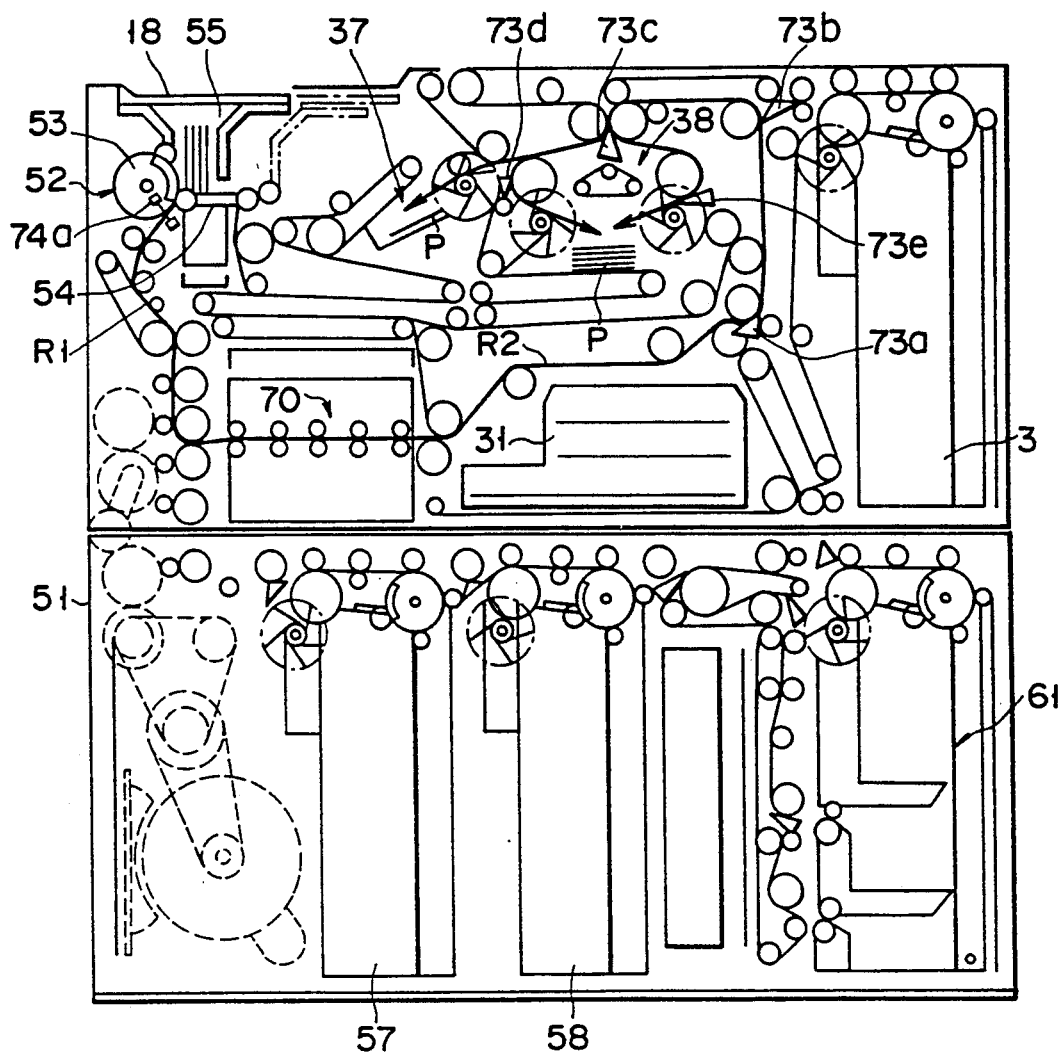
Figure 8:
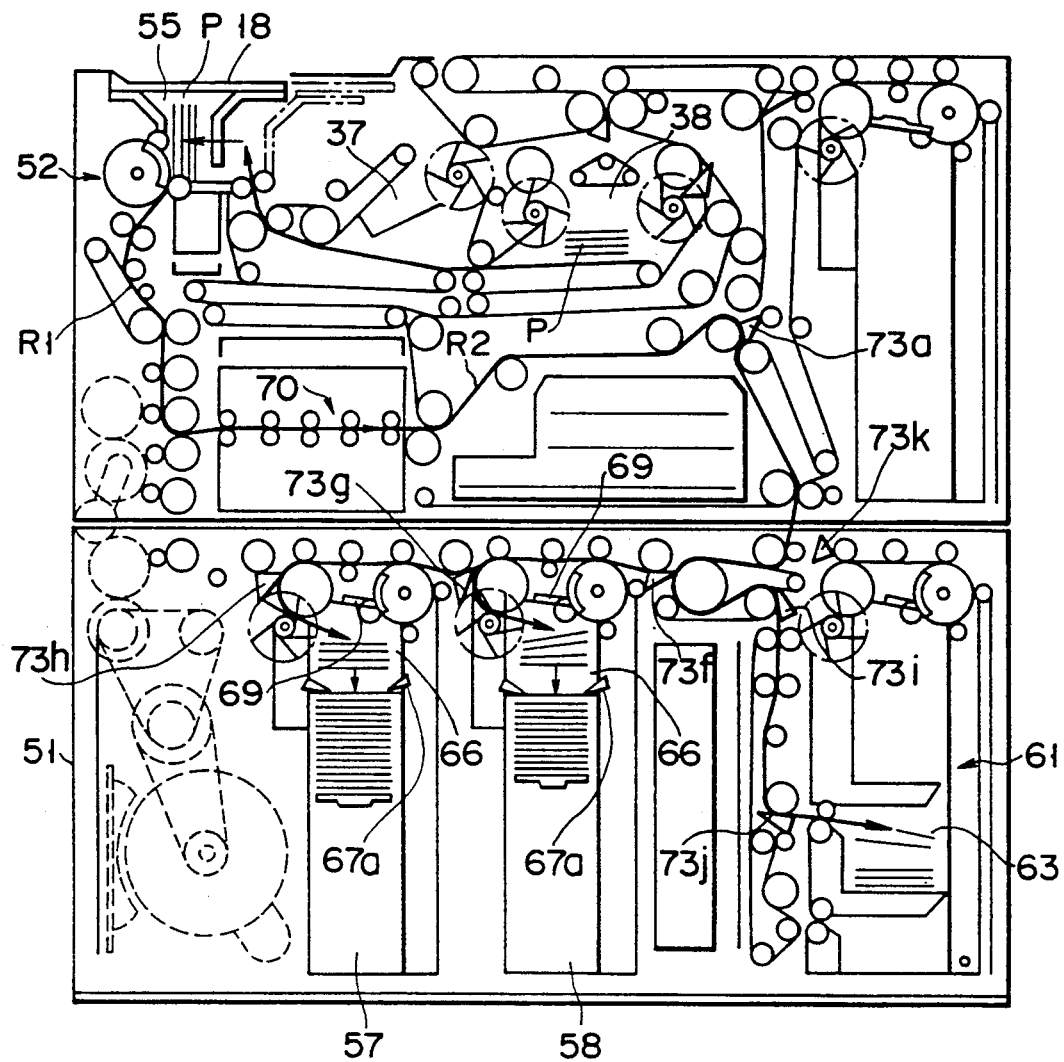

Both FIGS. 7 and 8 show the flows of the bank notes in a bank note deposit operation.

More specifically, when a display portion of the CRT display unit 19 corresponding to a deposit is depressed by a customer, the door 18 of the bank note receiving/dispensing opening 17 is opened. The customer places various kind of bank notes P in an upright state as a unit in the bank note storage chamber 55 through the opening 17 while the obverse and reverse sides of the bank notes are not aligned. Then, the door 18 is closed. When closing of the door 18 is detected by a sensor (not shown), the floor 54 is vertically vibrated to align the bank notes P, and subsequently, the take-in roller 53 is rotated to sequentially receive the bank notes P one by one from the front. The received bank notes P are conveyed along the convey path R1, and the number of them is counted by the detector 74a.

The bank notes P are then conveyed to the inspecting section 70 to discriminate their denominations, authenticities, and the obverse/reverse sides. The bank notes P are then conveyed along the convey path R2. The bank notes, which are determined that their obverse sides face upward, are conveyed upward through the first gate 73a, pass through the second and third gates 73b and 73c, are redirected by the fourth gate 73d, and then are stacked in the temporary stacking section 38.

When a bank note is determined by the inspection unit 70 that its reverse side faces upward, it passes through the first to third gates 73a to 73c, is redirected by the fifth gate 73e, and is stacked upside down in the stacking section 38. In this manner, the bank notes P are stacked in the stacking section 38 such that their obverse and reverse sides are aligned.

When a bank note P is determined by the inspection unit 70 that it should be rejected (a reject bank note; a counterfeit bank note or a bank note unable to be inspected), it is sent to the temporary stacking section 37 through the first, second, third, and fourth sorting gates 73am 73b, 73c, and 73d and is stacked therein. When the bank notes P in the bank note storage chamber 55 run out, the reject bank notes P in the stacking section 37 are discharged to the storage chamber 55 in a bundle. Then, the door 18 is opened, and the bank note bundle is returned to the customer.

Regarding the bank notes P stacked in the bank note reception temporary stacking section 38, for example, when the customer confirms the deposited amount displayed on the CRT display unit 19 and enters "confirm", they are conveyed to the bank note storage chamber 55 in a bundle, and then received again and conveyed. As shown in FIG. 8, the received bank notes P are discriminated by the inspection unit 70 and are conveyed to the lower unit 51 through the path R defined by the first sorting gate 73a.

¥ 10,000 bank notes discriminated by the inspecting section 70 are horizontally conveyed through the eleventh, sixth, and seventh sorting gates 73k, 73f, and 73g, redirected by the eighth sorting gate 73h, and stacked in the stacking section 66 of the ¥ 10,000 bank note safe 57. ¥ 1,000 bank notes are redirected by the seventh sorting gate 73g and stacked in the stacking section 66 of the ¥ 1,000 bank note safe 58.

Old ¥ 10,000 and ¥ 1,000 bank notes, ¥ 5,000 bank notes, and reject bank notes are redirected by the sixth sorting gate 73f, and stacked in the stacking section 63 of the bank note reception safe 61.

When all the bank notes P are stacked in the stacking sections 66 and 63 of the safes 57, 58, and 61, the bank notes P in the safes 57 and 58 are urged downward by the press plates 69 and locked and stacked under the flappers 67a, respectively. A deposit operation is thus completed.

If "disapprove" is entered through the display unit 19 while the bank notes P are stacked in the bank note reception temporary stacking section 38, the bank notes P in the section 38 are transferred to the bank note storage chamber 55 and returned to the customer as the door 18 is opened. When the bank notes p are removed from the storage chamber 55, the door 18 is closed.

In a deposit operation, if "cancel" is entered through, e.g., the CRT display unit 19 after the bank notes P are stacked in the stacking section 38, the bank notes P are discharged to the storage chamber 55 in a bundle. Then, the door 18 is opened to return the bank notes P to the customer.

Figure 9:
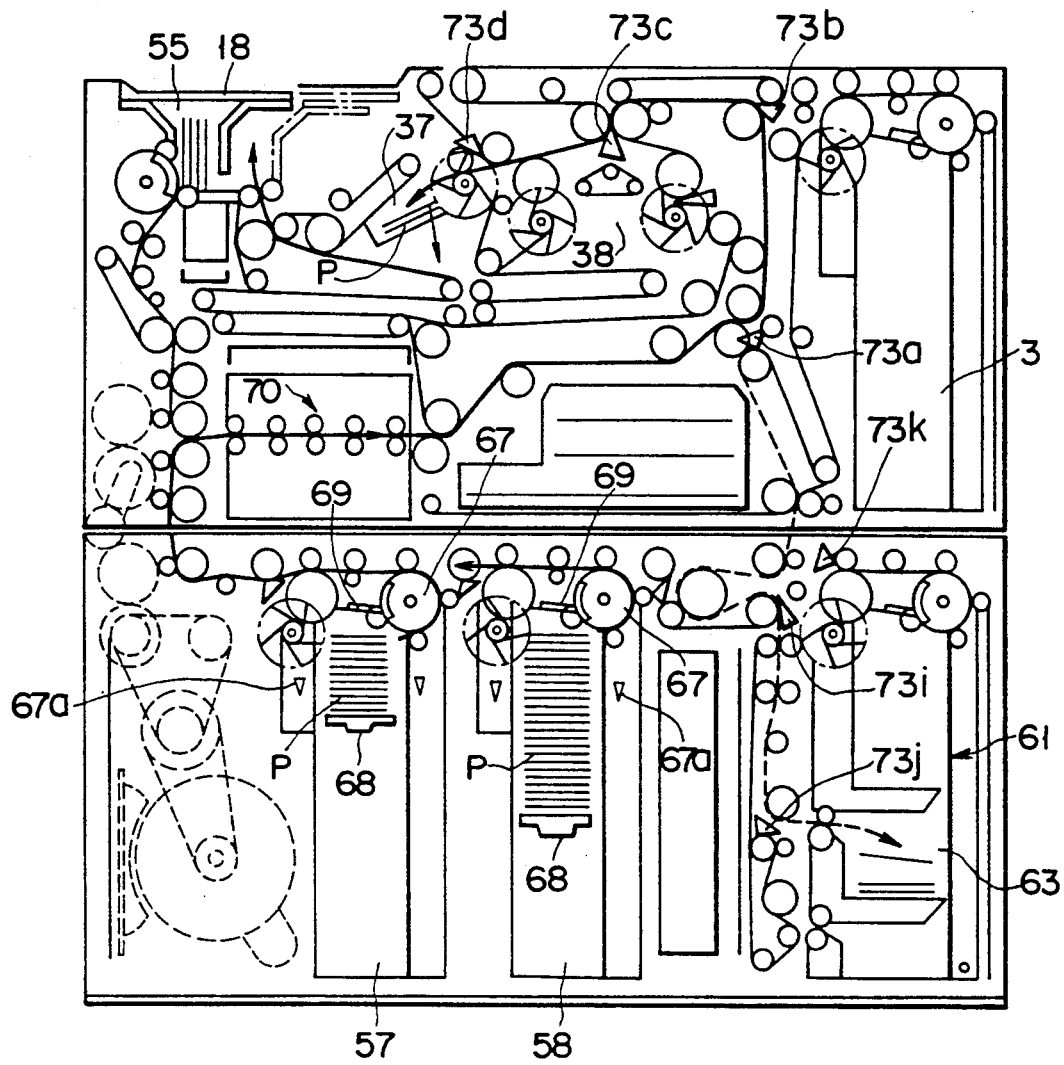

FIG. 9 shows the flow of bank notes in a dispensing operation.

A pre-dispensing operation is performed in the following manner. A dispensing transaction is selected through the CRT display unit 19 and an amount to be dispensed is entered. Then, in each of the safes 57 and 58, the press plate 69 urges the stored bank notes P downward to release the flappers 67a. The elevator 68 is moved upward to press the stored bank notes P against the pick-up roller 67.

When the pick-up rollers 67 are rotated, ¥ 10,000 and ¥1,000 bank notes are picked up one by one from the bank note safes 57 and 58, respectively. The picked ¥10,000 and ¥ 1,000 bank notes are respectively counted and are conveyed horizontally forward to the upper unit 50. These bank notes P are sent to the inspection unit 70. The bank notes P which are determined as authentic ones are stacked in the bank note dispensing temporary stacking section 37 through the first to fourth gates 73a to 73d. Then, when the amount of bank notes P coincides the input amount to be dispensed, the pick-up of the bank notes P is stopped, and the bank notes P stacked in the stacking section 37 are discharged to the bank note storage chamber 55 in a bundle and returned to the customer as the door 18 is opened. When the customer withdraws the bank notes P, the door 18 is closed, and the dispensing transaction is completed.

Bank notes P discriminated by the inspecting section 70 as being inappropriate for dispensing (reject bank note) are sent to the lower unit 51 through the first sorting gate 73a. As indicated by a broken line in FIG. 9, they are sent to the stacking section 63 of the bank note reception safe 61 through the eleventh, sixth, ninth, and tenth sorting gates 73k, 73f, 73i, and 73j, and are stacked therein.

Figure 10:
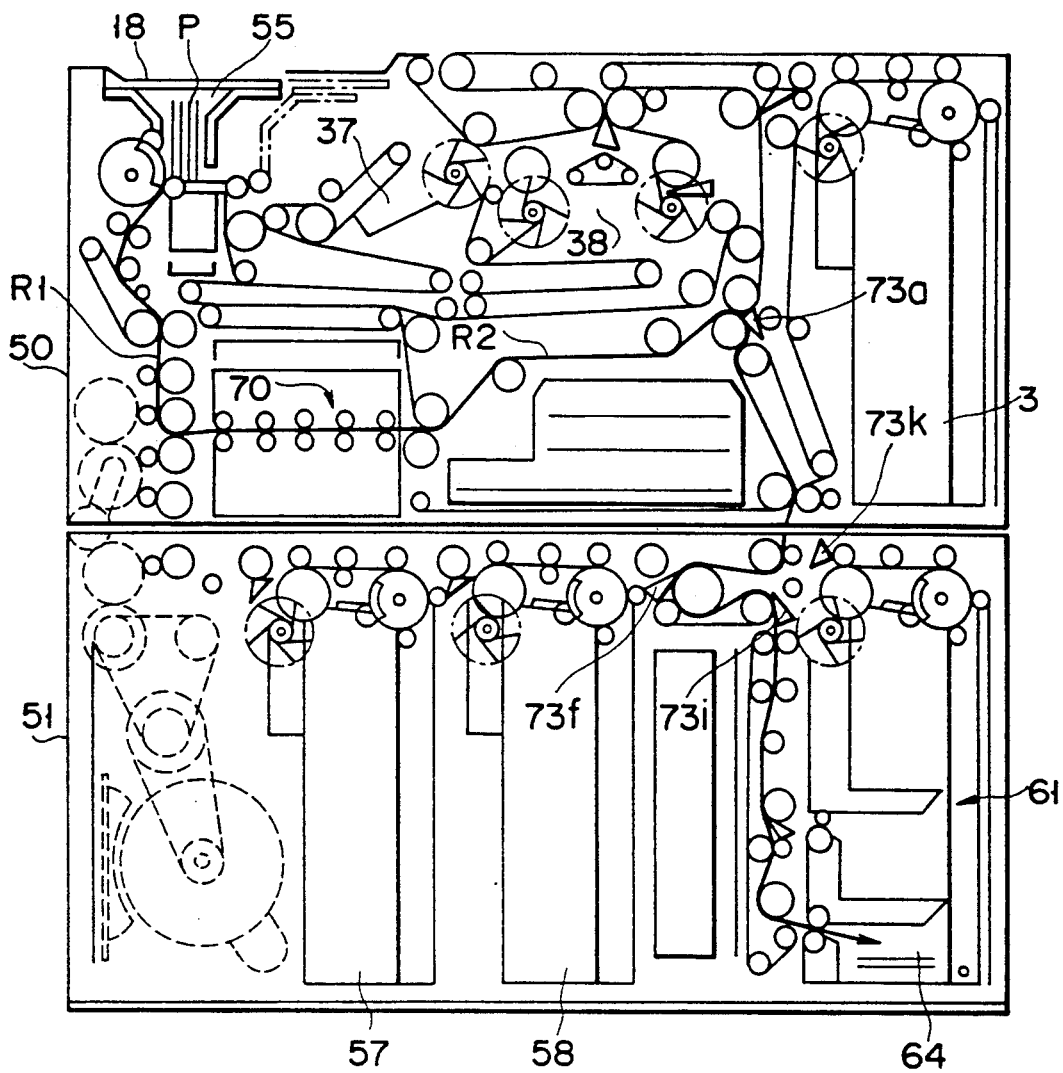

FIG. 10 shows the flow of bank notes in an operation for withdrawing the bank notes forgotten by the customer.

Specifically, while the door 18 is open, when the customer does not take out the dispensed bank notes P even after a lapse of a predetermined period of time, the door 18 is closed first. The bank notes P are received one by one from the storage chamber 55, and conveyed to the recovery box 64 of the reception safe 61 through the inspecting section 70 and the first, eleventh, sixth, ninth, and tenth sorting gates 73a, 73k, 73f, 73i, and 73j.

Figure 11:
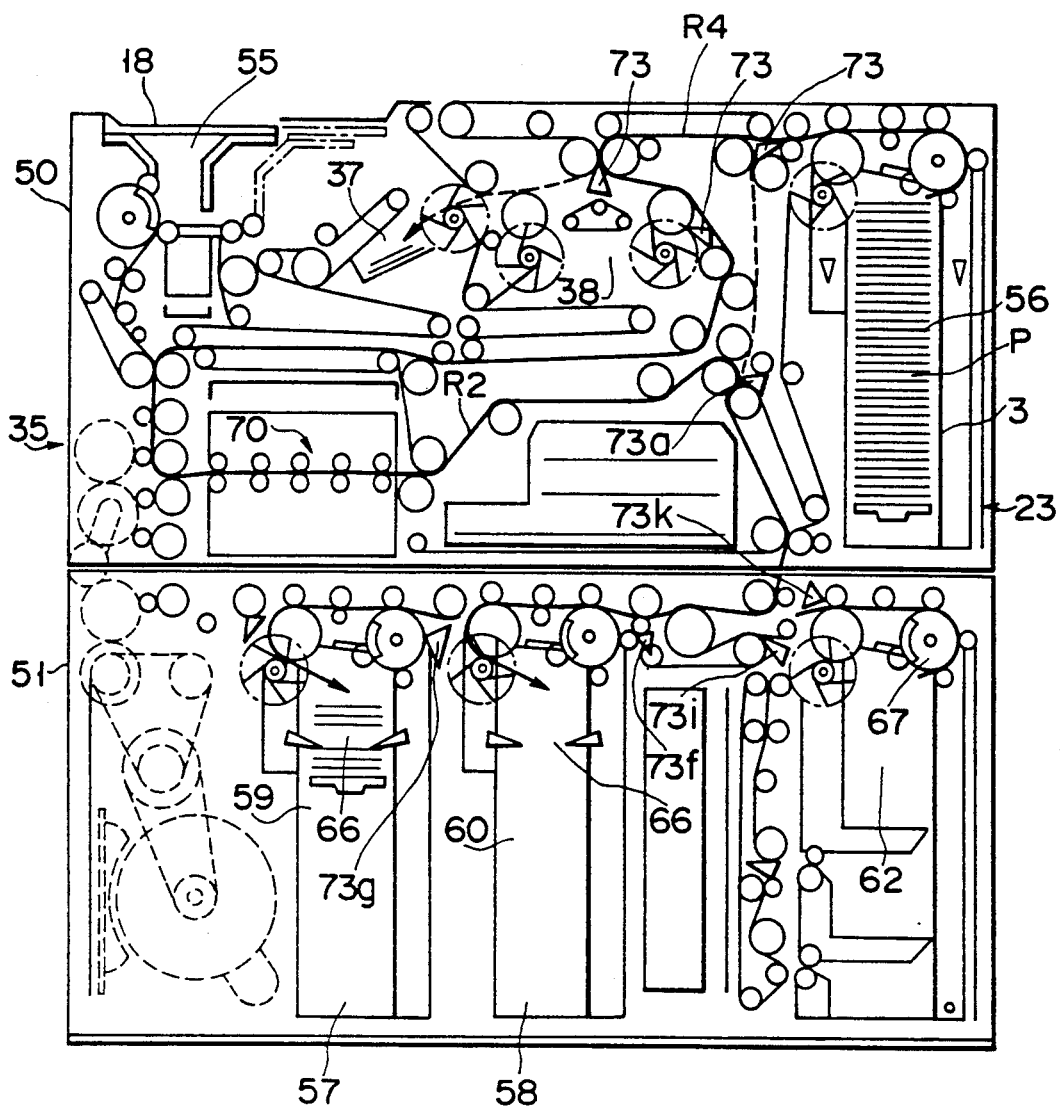

The flow of bank notes in a bank note loading (replenishing) operation will be described with reference to FIG. 11.

While the loading safe 3 storing bank notes P is set in the mount portion 23 of the upper unit 50, when a bank note loading mode is selected by the person in charge, the loading operation of bank notes P is started.

Specifically, the bank notes P are picked up from the storage section 56 by the pick-up roller 67 of the safe 3 one by one, and guided to the inspecting section 70 through the second, third, and fifth sorting gates 73b, 73c, and 73e, and the denominations of the bank notes P are discriminated. The discriminated bank notes P are conveyed downward through the first sorting gate 73a, and are sent through the eleventh and sixth gates 73k and 73f. In this case, ¥ 1,000 bank notes are redirected by the seventh sorting gate 73g and stacked in the stacking section 66 of the ¥ 1,000 bank note safe 58. ¥ 10,000 bank notes are conveyed through the seventh sorting gate 73g, redirected by the eighth sorting gate 73h, and stacked in the stacking section 66 of the ¥ 10,000 bank note safe 57. After that, these bank notes P are urged into the corresponding bank note storage sections 59 and 60.

Bank notes discriminated by the inspection unit 70 to be rejected are directed upward by the first sorting gate 73a and stacked in the temporary stacking section 37 through the second and third sorting gates 73b and 73c. In this case, bank note (loading bank note) picked up from the loading safe 3 and having passed through the second sorting gate 73b overlap on the reject bank notes in the convey path R4 between the second and third sorting gates 73b and 73c. For this reason, when a reject bank note is detected, the pick-up of the loading bank notes is instantaneously interrupted, and resumed after the reject bank note passes the convey path R4. Alternatively, the fetched bank notes (loading bank note) and reject bank notes overlapping one another may be conveyed and stacked together in the temporary stacking section 37.

When all of the bank notes P in the loading safe 3 run out, the loading operation is completed.

Figure 12:
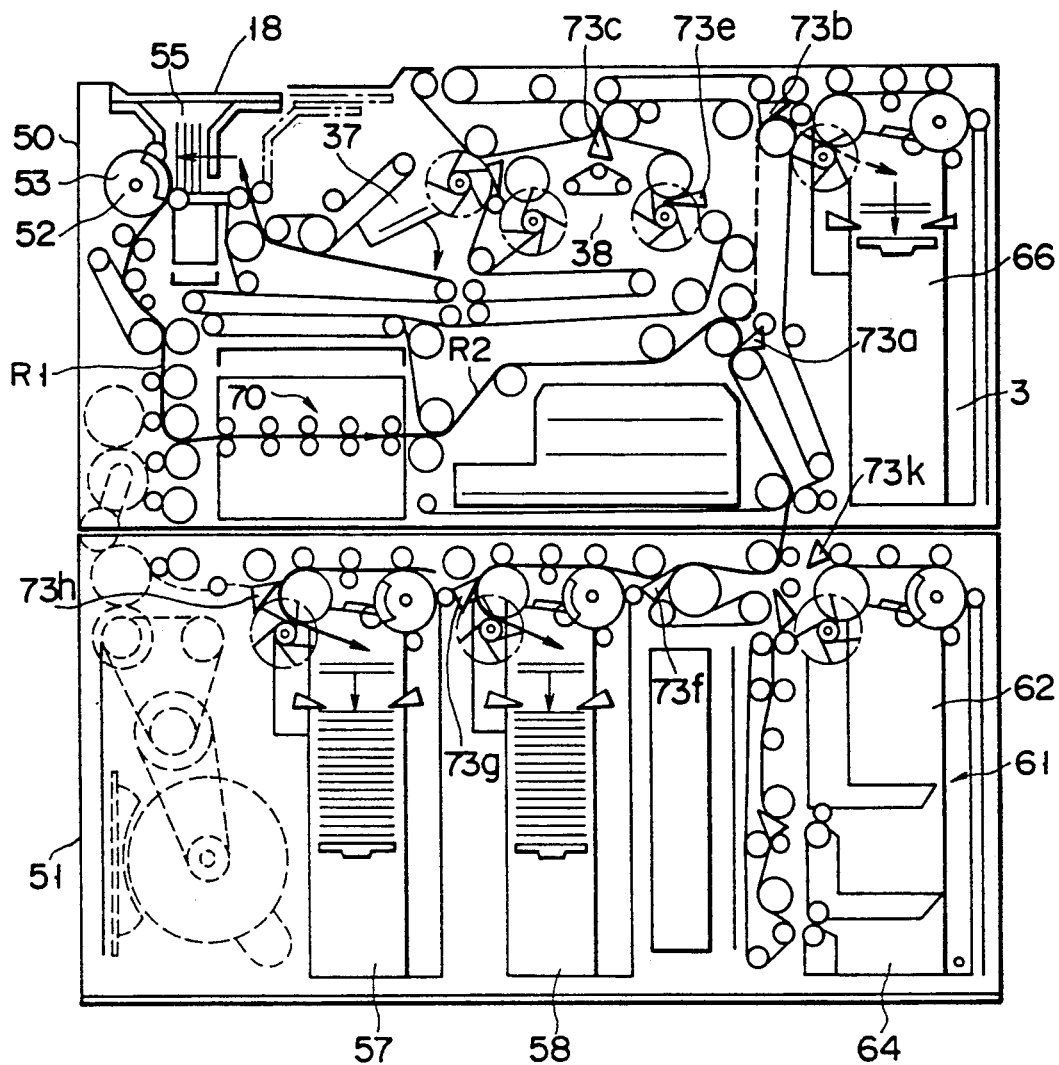

As shown in FIG. 12, the rejected bank notes P are conveyed to the bank note storage chamber 55 from the stacking section 37, received by the take-in roller 53 one by one, and are sent to the inspecting section 70 again. The bank notes, the denominations of which are discriminated, are guided to the lower unit 51 by the first sorting gate 73a and are stored in the safes 57 and 58 in accordance with their denominations.

A bank note which is rejected once again is guided upward through the first sorting gate 73a, redirected by the second sorting gate 73b, and returned to the loading safe 3.

In this embodiment, during the loading operation, the bank notes P are loaded only from the loading safe 3. However, in this system, bank notes can be loaded in the safes by setting bank notes in the storage section 62 of the bank note reception safe 61 and conveying them to the safes.

Figure 13:
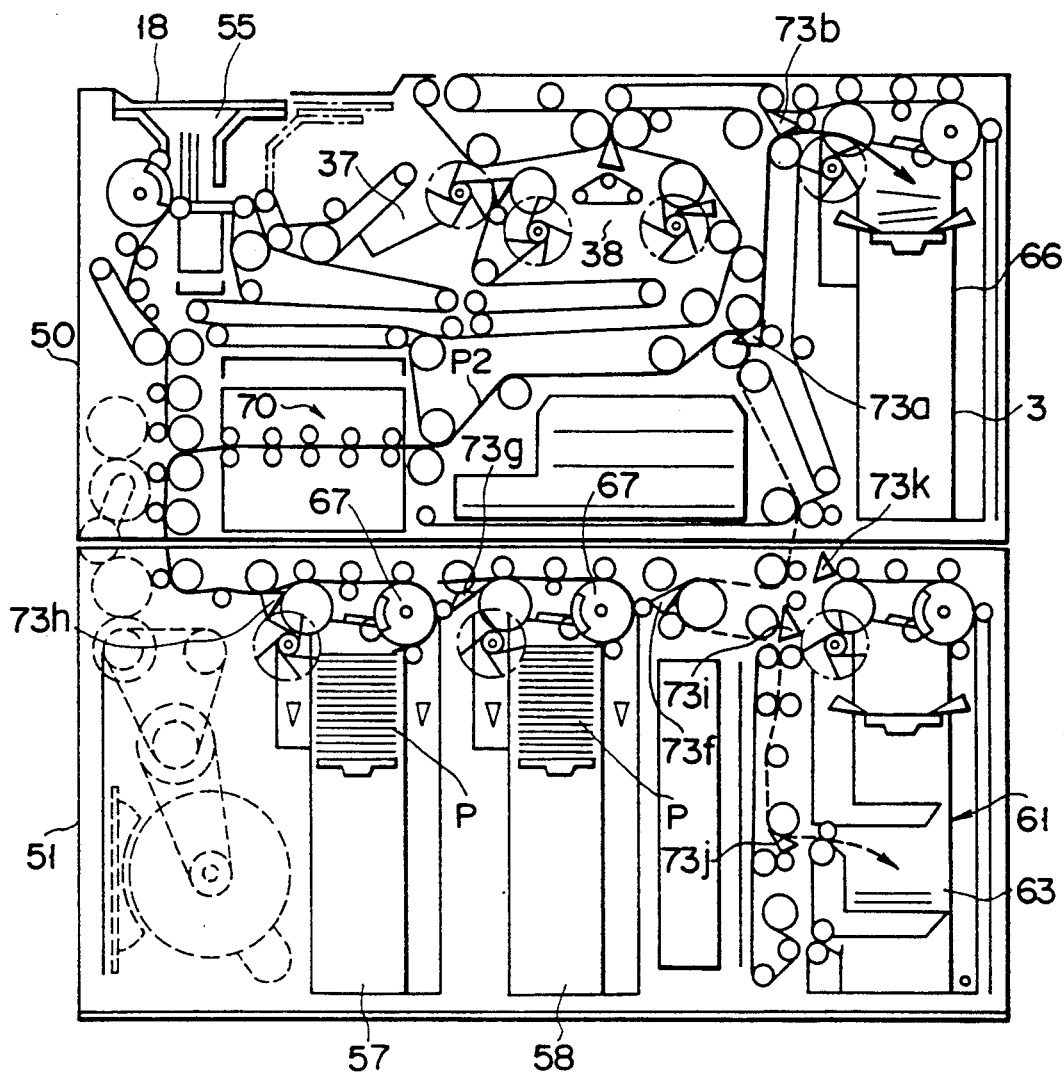

The flow of bank notes in a checking operation will be described with reference to FIG. 13.

Specifically, bank note P taken-out of the ¥ 10,000 or ¥ 1,000 bank note safe 57 or 58 are conveyed to the upper unit 50, discriminated by the inspecting section 70, redirected by the first and second sorting gates 73a and 73b, and stored in the loading safe 3. When reject bank notes such as them which cannot be discriminated are generated in the inspecting section 70, they are conveyed downward through the first gate 73a and stacked in the stacking section 63 of the bank note reception safe 61 through the eleventh, sixth, ninth, and tenth sorting gates 73k, 73f, 73i, and 73j.

In this embodiment, the first safe 57 is used as a ¥10,000 bank note safe, the second safe 58 is used as a ¥1,000 bank note safe, the bank note storage section 59 of the third safe 61 as a bank note reception safe, and the fourth safe 3 as a loading safe. However, the first safe 57 can be used as a safe for storing ¥ 1,000 bank notes or bank notes of another denomination, and the second safe 58 can be used as a safe for storing ¥ 10,000 bank notes or bank notes of another denomination. Furthermore, to operate the teller machine on off days, bank notes for dispensing or replenishing may be stored in the bank note storage section 62 of the third safe 61 and the loading safe 3 so that theses safes can be used as a bank note dispensing safe.

Figure 14:
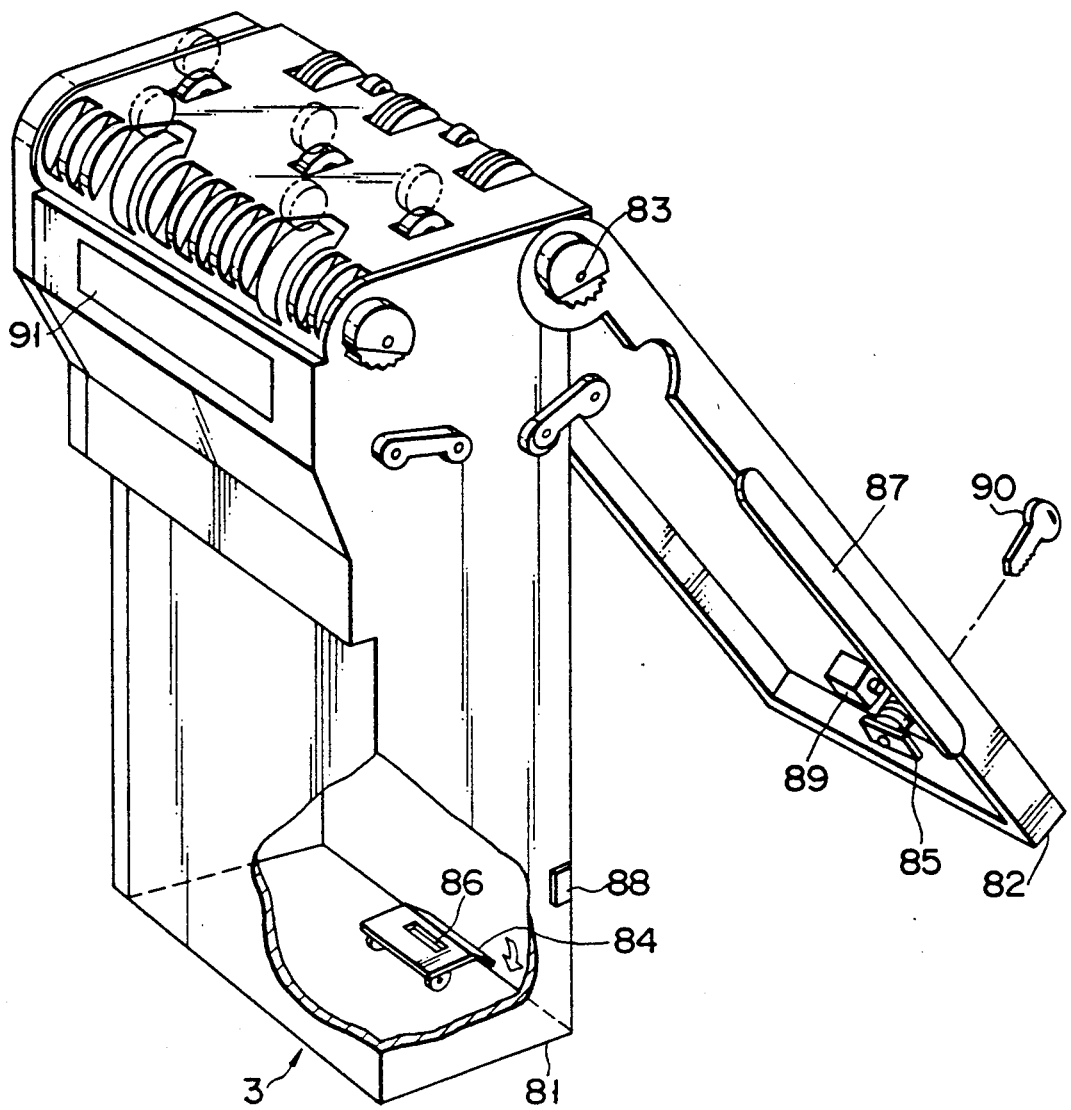

As shown in FIG. 14, the loading safe 3 has a rectangular box-like main body 81, one side wall of which constitutes a lid 82 rotatable about a take-out roller 83 for opening and closing. An automatic lock 84 for controlling opening/closing of the lid 82 is provided in the central portion of the bottom of the main body 81, and a hole 86 engaging with a lock plate 85 of the lid 82 is formed on the central portion of the automatic lock 84. A detector 88 is provided on a side surface of the main body 81. The detector 88 detects loading/unloading of the loading safe 3 to and from the bank note reception/dispensing unit 35, by means of a magnetic force of a magnet 87 on the lid 82. A lock mechanism 89 for controlling opening/closing of the lid 82 is provided at a lower central portion of the lid 82. A locking plate 85 for engaging with the hole 86 is provided to the lock mechanism 89. When the lock can be released, the lock plate 85 is rotated by an external key 90 thereby allowing the lid 82 to be opened. A display unit 91 is provided on an upper front surface of the main body 81.

As shown in FIG. 2, the control circuit of the loading safe 3 includes a control section 92, a data memory 93, an interface 94 used for connecting the safe 3 with the taller machine and arrangement device 2, a ROM 95 storing a program for controlling the safe 3, a bank note convey mechanism 96 for taking bank notes in and out of the safe 3, the display unit 91, and the detector 88. The control section 92 controls the entire operation of the loading safe 3. The data memory 93 stores the bank note storing state of the teller machine 2a in which the loader 3 is mounted, the bank note counts in units of denominations of the safe 3, and replenish designation data, as shown in FIG. 15. The data memory 93 comprises an EEPROM or a RAM backed up by a battery (not shown).

In order to clarify the management content of the loading safe 3, a detector (not shown) for detecting opening/closing of the lid 82 is provided at the lid 82 of the safe 3. When the lid 82 is manually opened, the bank note data stored in the data memory 93 of the safe 3 is cleared, and no data is input in the memory 93 until the amount of the bank notes in the safe 3 is checked by the bank note arrangement device 2.

As shown in FIG. 16, the bank note arrangement device 2 has a counter unit 101 and a storage unit 102 for replenishing bank notes P in the loading safe 3. An ID card insertion slot 103 for receiving an ID card 103a storing an operator number and the like is formed in the front surface of the counter unit 101. The counter unit 101 has a hopper 104 under the ID card insertion slot 103. Under the insertion slot 103 is arranged a hopper 104 into which bank notes P to be replenished in the safe 3 are placed. An inspection unit 105 for discriminating the denominations of the bank notes P sequentially picked up from the hopper 104 is provided in the central portion of the unit 101. In the upper portion of the unit 101 are arranged a stacking section 106 for stacking rejected bank notes and a stacking unit 107 for stacking defaced bank notes adjacent to the stacking unit 106. A bank note P discriminated as a reject bank note by the inspection unit 105 is conveyed to the stacking unit 106, and a bank note P discriminated as a defaced bank note by the inspection unit 105 is conveyed to the stacking unit 107.

The storage unit 102 has a mount section 24 to which the loading safe 3 is detachably fitted. Bank notes P discriminated as being authentic by the inspection unit 105 are conveyed to the safe 3 through a convey path R10, and stored in the storage section 56 of the safe 3.

As shown in FIG. 2, the control circuit of the bank note arrangement device 2 has a control unit 110, a data memory 111, an interface 112 used for connecting the safe 3 with the device 2, a ROM 113 for storing a control program, a bank note convey mechanism 114 for conveying bank notes through the path R10 and the like, a display unit 115, the inspection unit 105, and a printer 117 for printing the bank note storing date of the respective taller machines. The control unit 110 controls the entire operation of the arrangement device 2. The data memory 111 stores the bank note storing states of the respective teller machines 1a, 1b, . . . that are under management, and the bank note storing state of the arrangement device 2, as shown in FIG. 17. The data memory 111 comprises an EEPROM or a RAM backed up by a battery (not shown).

The operations of the arrangement device 2 and the loading safe 3 having the above arrangements will be described.

An operation for replenishing bank notes P to the loading safe 3 by means of the arrangement device 2 will be described first. As shown in FIG. 16, the loading safe 3 acting as a data transfer means, is set in the arrangement device 2, and bank notes P to be replenished are placed in the hopper 104. In this case, the control section 110 of the arrangement device 2 and the control section 92 of the safe 3 are connected through the interfaces 112 and 94 as the control section 110 sends a connection permit signal to the section 92, in response to a connection request signal from the section 92.

When the start of bank note replenishment is designated, the bank notes P placed in the hopper 104 are sequentially picked up and conveyed to the inspection unit 105. The bank notes P which are discriminated as being authentic by the inspection section 105 are stored in the loading safe 3 through the convey path R10. In this case, the control section 110 of the arrangement device 2 checks the number of bank notes P supplied into the safe 3 in response to the discrimination result of the inspection section 105. The number of bank notes P stored in the safe 3 is stored in the data memory 111 and simultaneously output to the control section 92 of the safe 3 through the interfaces 112 and 94. As a result, the control section 92 causes the data memory 93 to store the denominations and number of bank notes P in the safe 3.

An operation for replenishing the bank notes P from the loading safe 3 to the teller machine 1a will be described. Specifically, the safe 3 acting as a data transfer means and filled with a predetermined number of bank notes P by the bank note arrangement device 2, in the manner as described above, is set in the mount section 23 of the teller machine 1a, as shown in FIG. 6. In this case, the main control section 31 of the teller machine 1a and the control section 92 of the loading safe 3 are connected through the interfaces 44 and 94 as the section 31 sends a connection permit signal to the section 92 in response to a connection request signal from the section 92. Then, the control section 92 outputs to the main control section 31 the denominations and number of the bank notes stored in the safe 3 from the data memory 93.

The main control section 31 reads out the numbers of bank notes of the respective denominations of the bank notes currently stored in the teller machine from the RAM 39 and compares it with an appropriate bank note balance. As the result of this comparison, if the bank note balance is insufficient, loading of shortage amount is determined, and designation to load the shortage amount is output to the control section 92. Thus, the loading operation as described above is performed, and the bank notes P stored in the loading safe 3 are loaded in the first or second safe 57 or 58. When the shortage amount is replenished by this loading operation, the main control section 31 outputs a loading end signal, the machine number of the teller machine 1a, the bank note balances of the respective safes, and the number of stored bank notes in units of denominations to the control unit 92. The control section 92 of the safe 3 updates the denominations and number of bank notes stored in the safe 3 in accordance with the loaded bank note content, and causes the data memory 93 to store the machine number of the teller machine 1a, the bank note balances of the respective safes, and the number of stored bank notes in units of denominations.

When it is determined that the bank note balance is insufficient by the main control section 31 of the teller machine 1a and that the bank notes P corresponding to the shortage amount are not stored in the loading safe 3, the loading operation is not performed. In this case, the main control section 31 outputs a signal representing that bank notes P in the safe 3 are insufficient and an amount to be replenished to the control section 92 of the loader 3. In response to this, the control section 92 causes the data memory 93 to store the signal representing that the bank notes P to be supplied are insufficient and replenish designation data (machine number, an amount to be replenished, denominations, the number of bank notes), and prompts replenishment on the display unit 91.

After that, the loading safe 3 is removed from the teller machine 1a by the person in charge and set again to the bank note arrangement device 2. When the control section 110 of the device 2 and the control section 92 of the safe 3 are connected to each other, the control section 92 outputs a signal representing that the bank notes P in the safe 3 to be loaded are insufficient and the replenish designation data to the control section 110. The control section 110 prompts to the person in charge supply of bank notes P of a needed amount to be replenished, by means of the display unit 115 FIG. 2. In response to this prompt, bank notes P are placed in the hopper 104, and the arrangement device 2 replenishes the loading safe 3 with the bank notes P based on the replenish designation data. In response to this, the control section 92 updates the denominations and number of bank notes P in the safe 3, which are stored in the data memory 93, and guides the person in charge to set the safe 3 in the teller machine 1a by means of the display section 91.

In response to this guidance, the replenished loading safe 3 is set in the teller machine 1a. Then, bank notes corresponding to the shortage amount are supplied in the first or second safe 57 or 58 from the safe 3. Thereafter, the main control section 31 outputs a signal indicating the terminate of loading to the control unit 92 together with the machine number of the teller machine 1a, the bank note amounts, and the numbers of stored bank notes in units of denominations of the respective safes. As a result, the control section 92 updates the denominations and number of bank notes in the loading safe 3, which are stored in the data memory 93, in accordance with the loading content described above, and causes the data memory 93 to store the machine number, and the bank note amounts and numbers of bank notes in units of denominations, of the respective safes.

On the basis of this replenish designation data, the main control section 31 of the teller machine to which the loading safe 3 is mounted compares its own machine number with the machine number of the replenish designation data. The teller machine receives the bank notes for replenishment only when the machine numbers coincide. In this manner, erroneous bank note replenishment to another teller machine can be prevented.

Loading operations of bank notes from the loading safe 3 to another teller machines 1b, 1c, and 1d are performed in the same manner as described above.

When the loading safe 3 is set in the teller machine 1a, if the stored amount of the teller machine 1a is over the appropriate bank note amount, an adjusting operation is performed. Specifically, the excessive amount is determined, and the excessive bank notes P stored in the first or second safe 57 or 58 are sequentially picked up and conveyed to the safe 3. When the excessive amount is adjusted by this operation, the main control section 31 outputs a signal for indicating the termination of adjustment to the control section 92 of the loading safe 3 together with the machine number of the teller machine 1a, and the current balances and numbers of bank notes in units of denominations of the respective safes. In response to this, the control section 92 updates the denominations and number of bank notes in the safe 3, which are stored in the data memory 93, and causes the data memory 93 to store the machine number and the bank note balances and the numbers of bank notes in units of denominations of the respective safes.

Adjusting operations with respect to another teller machines 1b, 1c, and 1d by means of the loading safe 3 are performed in the same manner as described above.

When the loading safe 3 is set in the bank note arrangement device 2 once again and the control section 110 of the device 2 and the control section 92 of the safe 3 are connected, the denominations and the numbers of bank notes in the safe 3, the machine number of the teller machine 1a, 1b, 1c, or 1d which has subjected to the loading and/or adjusting operation, and the bank note balances and numbers of bank notes in units of denominations of the respective safes in the respective machines, all of which are stored in the data memory 93, are read out by the control section 92 and output to the control section 110. In this manner, the control section 110 causes the data memory 111 to store the bank note amounts of the respective safes and the number of bank notes in units of denominations, of the respective teller machines, and total them.

Bank notes P which are excessive in a teller machine, e.g., the teller machine 1a, and loaded in the loading safe 3 may be used to replenish another teller machine 1b, 1c, or 1d.

According to the cash managing system having the above-mentioned arrangement, bank note replenishment and the like to an automatic teller machine installed in a bank and the like can be performed without any need of a person in charge to touch the bank note directly. At the same time, the bank note balances of the respective teller machines and the loader can be totalled by the bank note arrangement device 2 via the loading safe 3, and bank note management can be performed quickly and reliably. Specifically, since the loader performs bank note balance management of the respective teller machines and also serves as the interface of the data transmission between the teller machines and the arrangement device 2, the bank note information can be centralized in the arrangement device 2 only by sequentially setting the loading safe 3 in the respective teller machines. As a result, according to the system of the present invention, bank note management of each teller machine as well as collective management of all teller machines can be easily performed.

In the above embodiment, the identification information and a bank note amount of the respective automatic teller machines are stored in the memory 93 of the loader 3 in groups corresponding to each of the teller machines, and the identification information and bank note balances of the respective teller machines which are stored in the memory 93 are totalled by the bank note arrangement device 2. The control section 110 is constituted to have the following totalling function. That is, the control section 110 may print the bank note amounts (the number of bank notes in units of denominations, the amounts, the total amount) of the respective teller machines and the total bank note amount (the number of bank notes in units of denominations, the amounts, and the total amount) of all the teller machines, by means of the printer 117, display them on the display unit 115, or write them in the ID card 103a.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A cash managing system comprising:
   a plurality of automatic teller machines, each comprising first storage means for storing bank notes, and means for dispensing the bank notes stored in the storage means to a customer;
   data transfer means, selectively coupled to each of the automatic teller machines and comprising:
   data receiving means for receiving bank note storage data, indicating an amount of the bank notes stored in the storage means of a respective one of the automatic teller machines, from each of the automatic teller machines;
   data storing means for storing the bank note storing data of each of the automatic teller machines; and a note storage portion for storing at least one of the bank notes; and an arrangement device comprising:

second data receiving means for receiving, from the data transfer means, the bank note storage data of the automatic teller machines stored in the data transfer means means for calculating a total of the bank notes stored in the plurality of automatic teller machines in accordance with the bank note storage data received by the second data receiving means; and means for supplying a portion of the bank notes to the note storage portion when the data transfer means is coupled to the arrangement device;

each of the automatic teller machines comprising means for conveying bank notes between the note storage portion of the data transfer means and the storage means of the automatic teller machine when the data transfer means is coupled to the automatic teller machine.

2. A system according to claim 1, wherein each of said automatic teller machines includes balance storing means for storing a predetermined appropriate bank note balance, and balance output means for outputting a signal indicating a shortage of bank notes, when an actual bank note balance in the teller machine is less than the appropriate bank note balance, and for outputting a signal indicating an excess of bank notes, when the actual balance is more than the appropriate bank note balance, and wherein the data transfer means includes means for actuating the conveying means in response to the output signal from the balance output means of the automatic teller machine to which the data transfer means is connected, so as to supply bank notes corresponding to the shortage amount from the data transfer means to the automatic teller machine and so as to convey bank notes corresponding to the excessive amount from the automatic teller machine to the transfer means.

3. A system according to claim 2, wherein said data transfer means includes second storing means for storing, when the bank notes in the storage portion of the data transfer means is less than the shortage amount output from the balance output means, identification information and the shortage amount of the bank notes in the automatic teller machine to which the data transfer means is connected, and means for displaying a bank note replenish command.

4. A system according to claim 3, wherein said arrangement device includes second actuating means for actuating, when the data transfer means is connected to the arrangement device, the supplying means on the basis of the shortage amount stored in the second storing means so as to supply bank notes from the arrangement device to the storage portion of the data transfer means.

5. A system according to claim 4, wherein each of said automatic teller machines includes means for comparing the identification information of the automatic teller machine with the identification information stored in the second storing means when the data transfer means is connected to the automatic teller machine, and means for allowing the transfer of the bank notes from the data transfer means to the automatic teller machine when the identification information compared by the comparing means coincide with each other.

6. A cash managing system comprising:

a plurality of automatic teller machines each of which includes storage means for storing bank notes, means for dispensing the bank notes in the storage means to a customer, and means for calculating a shortage amount of bank notes when the amount of the bank notes stored in the storage means is less than an appropriate amount;

a bank note cassette designed to be selectively connected to each of the automatic teller machines and including data receiving means for receiving bank note storage data, indicating the shortage amount calculated by the calculating means, from each of the automatic teller machines, storing means for storing the received shortage amount data of each of the automatic teller machines, and a storage portion for storing bank notes to be supplied to the automatic teller machines; and an arrangement device including second data receiving means for receiving the shortage amount data of the automatic teller machines from the bank note cassette, and means for supplying bank notes corresponding to the shortage amount to the storage portion of the bank note cassette on the basis of the data received by the second data receiving means.

7. A system according to claim 6, wherein each of said automatic teller machines includes means for conveying the bank notes stored in the storage portion of the bank note cassette to the storage means of the automatic teller machine.

* * * * *